United States Patent [19]

Szlam

[11] Patent Number: 4,742,539
[45] Date of Patent: May 3, 1988

[54] TELEPHONE LOOP CURRENT MODULATOR

[75] Inventor: Aleksander Szlam, Marietta, Ga.

[73] Assignee: Melita Electronic Labs, Inc., Atlanta, Ga.

[21] Appl. No.: 14,015

[22] Filed: Feb. 12, 1987

Related U.S. Application Data

[62] Division of Ser. No. 752,053, Jul. 5, 1985, Pat. No. 4,677,663.

[51] Int. Cl.[4] ............................................. H04M 19/02
[52] U.S. Cl. ..................................... 379/377; 379/387
[58] Field of Search ............... 379/387, 393, 162, 163, 379/352, 377, 380, 81, 96, 97, 98, 442, 443, 395

[56] References Cited

U.S. PATENT DOCUMENTS 4,063,045 12/1977 Greischar ............................ 379/98
4,440,981 4/1984 Grantland et al. ............. 379/387 X
4,475,009 10/1984 Rais et al. ............................ 179/2 A Primary Examiner—James L. Dwyer
Attorney, Agent, or Firm—Jones, Askew & Lunsford

[57] ABSTRACT

An improvement to automatic answering and call forwarding features used in telephone communications which allows a user to remotely activate, modify, and deactivate these features. The improvement describes a transformerless means for coupling signals to and from the telephone line without compromising the operation of the telephone line. The apparatus employs a microprocessor controller (11) with memory (12), a tone encoder (15), a toner decoder (14), a voice synthesizer (16), a timer (13), a cassette interface (17), an RS232C interface (20), a switching matrix (21), and a line interface (22). Audio, pulse dial, and tone signals are routed among the components and the telephone line (51) by the switching matrix (21) and line interface (22). The line interface (22) provides a transformerless means for coupling signals to and from the telephone line (51) and also analyzes the status of, and signals present on, the telephone line (51).

14 Claims, 6 Drawing Sheets

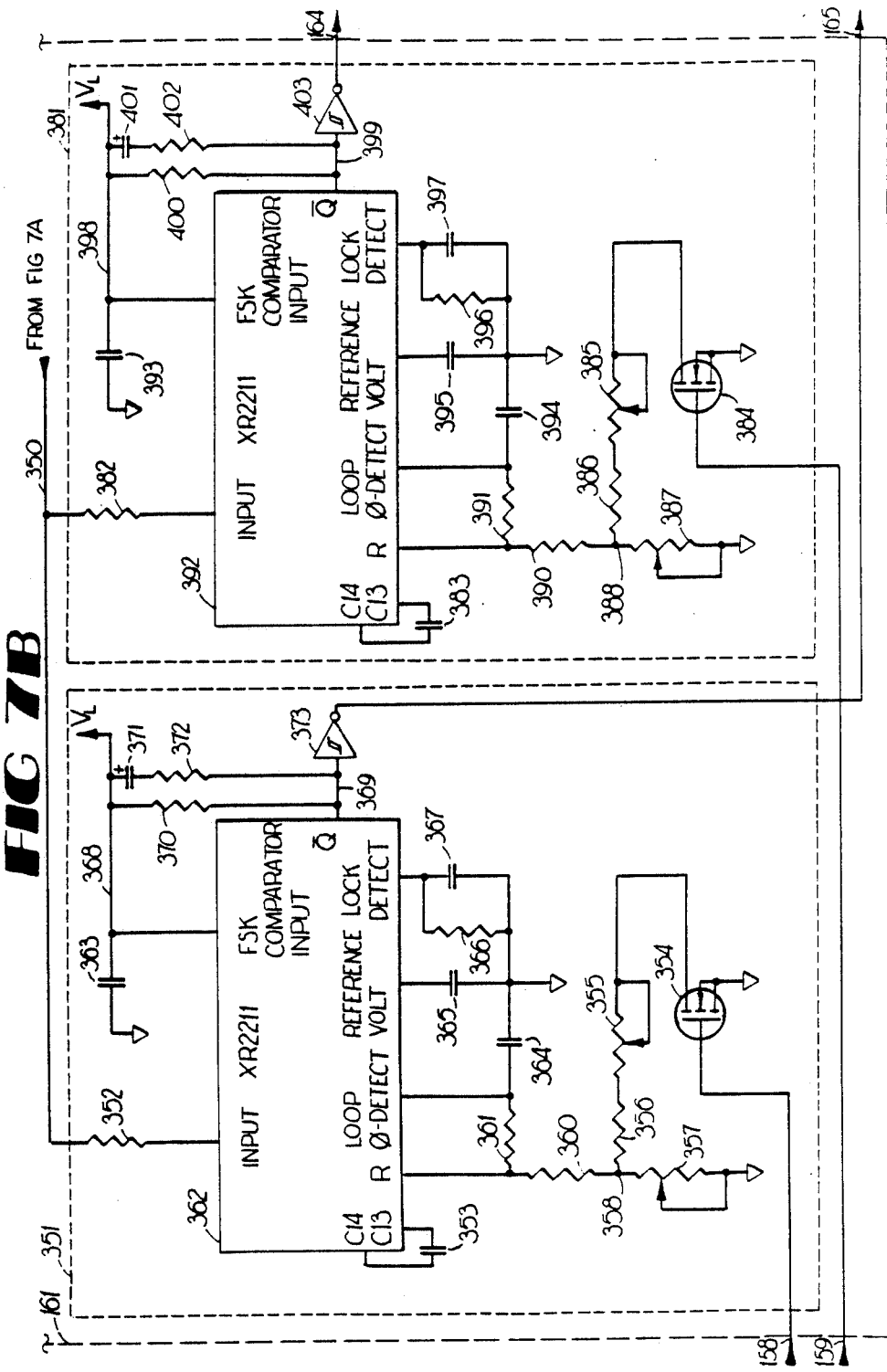

TELEPHONE LOOP CURRENT MODULATOR

This is a divisional application of U.S. patent application Ser. No. 752,053, filed July 5, 1985, by Aleksander Szlam, entitled "Telephone Answering and Call Forwarding Improvement", now U.S. Pat. No. 4,677,663.

TECHNICAL FIELD

The present invention relates to call processing in telephony and, in particular, is an improved device for remotely activating, modifying, and deactivating automatic answer features and telephone company central office call forwarding equipment. The present invention also relates to line interfacing apparatus in telephony and, in particular, is an improved device for transmitting and receiving signals over a standard telephone line without using transformers.

BACKGROUND OF THE INVENTION

At present, a subscriber to a telephone service may use an automatic answering machine, which may or may not be designed to record a message from a calling party, or use an answering service. The subscriber may also use a call forwarding feature offered by the local telephone company which automatically routes incoming calls to a different telephone number.

Answering services and telephone company call forwarding features are not available everywhere and, where available, require the periodic payment of a fee for that service or feature. Furthermore, automatic answering machines and telephone company call forwarding features must be activated and deactivated at the subscriber's telephone set and cannot be remotely activated or deactivated. If a subscriber has the use of a call forwarding feature and plans to be at two or more different locations during the day he must either return to his office between every different location or resign himself to having some of his calls forwarded to a first location (to which the calls are routed) while he is at the second location.

Furthermore, he must return to his office to cancel the call forwarding feature. The subscriber must also return to his office if he wishes to change from automatic answer to call forward, or vice versa. These limitations are a major inconvenience to a busy subscriber whose time is valuable and cannot be wasted on making numerous return trips to his office. Under these conditions, the utility of conventional call forward service is limited.

Thus, there is a need for an improvement in telephone answering and call forwarding apparatus which will allow for remote activation, modification, and deactivation of an automatic answering device and the call forwarding service provided by central office equipment.

Conventional devices which transmit or receive information over telephone lines have one or more transformers to isolate the telephone line from grounding by the device. Transformers often significantly increase the size, weight and cost of the devices in which they are used. Transformers also have a limited bandwidth, do not pass direct current, and therefore limit the amount of information that may be obtained from the telephone line. There is, therefore, a need for a device which can transmit and receive information over telephone lines without transformers but which does not ground the telephone line.

SUMMARY OF THE INVENTION

The present invention fulfills the above need by providing a means for remotely activating, modifying, and deactivating automatic answering features and call forwarding features and for remotely changing the number to which incoming calls are to be forwarded. The present invention overcomes the drawbacks of the prior art by allowing the subscriber to call his office from a different location and, by dialing in an access code and a predetermined command code, selectively activate and deactivate an automatic answering feature provided by the present inventin and the call forwarding service provided by central office equipment. The subscriber can also change the number to which his calls are to be forwarded, play back recorded messages by the priority of the message, and change certain other parameters of operation, such as the number of incoming calls which will cause the present invention to automatically cancel the call forwarding service. The subscriber may also selectively cause the present invention to cancel the call forwarding service either after a predetermined number of incoming calls or after a predetermined number of incoming calls within a predetermined time window.

A typical automatic answering device will answer an incoming call and, if desired, prompt the calling party to leave a message and then record the message left by the calling party. The present invention, in addition to the above function, can also prompt the calling party to call a different telephone number and allow the subscriber to remotely change the telephone number to be called. The present invention can also prompt the calling party to dial in the telephone number where he can be reached and to dial a code indicating the urgency (priority) of his call. The subscriber can then remotely retrieve these messages, by priority if desired. The subscriber will hear the telephone number and priority, not as a series of tones, but as a series of spoken words and numbers.

The present invention accomplishes these functions and improvements by measuring the D.C. voltages and currents present on the telephone line, by measuring the frequency content of signals on the telephone line, by measuring the duration of and counting the number of ringing signals present on the telephone line, by sinking current from the telephone line, and by coupling tones and voice signals to the telephone line.

The present invention also uses both capacitance and high-resistance coupling to transfer information to and from the telephone line, thereby avoiding the use of transformers for coupling. The present invention has an isolated system ground and an isolated RS-232C interface to prevent grounding of the telephone line. This coupling method allows the present invention to measure the DC voltages and currents present on the telephone line with simple, inexpensive circuits which do not disturb the status of the telephone line.

Thus, it is an object of the present invention to provide apparatus for remotely activating, modifying, and deactivating automatic answer devices and call forwarding service.

It is a further object of the present invention to provide a means for detecting when a remote party has answered a call or has gone on-hook.

It is a further object of the present invention to provide improved apparatus for quantifying signals which are present on a telephone line.

It is a further object of the present invention to provide a device for answering incoming calls and for originating calls with a subscriber line interface which couples signals to or from the telephone line without using transformers or grounding the telephone line.

These and other objects of the present invention will become apparent upon reading the detailed description below.

DETAILED DESCRIPTION

Figure 1:
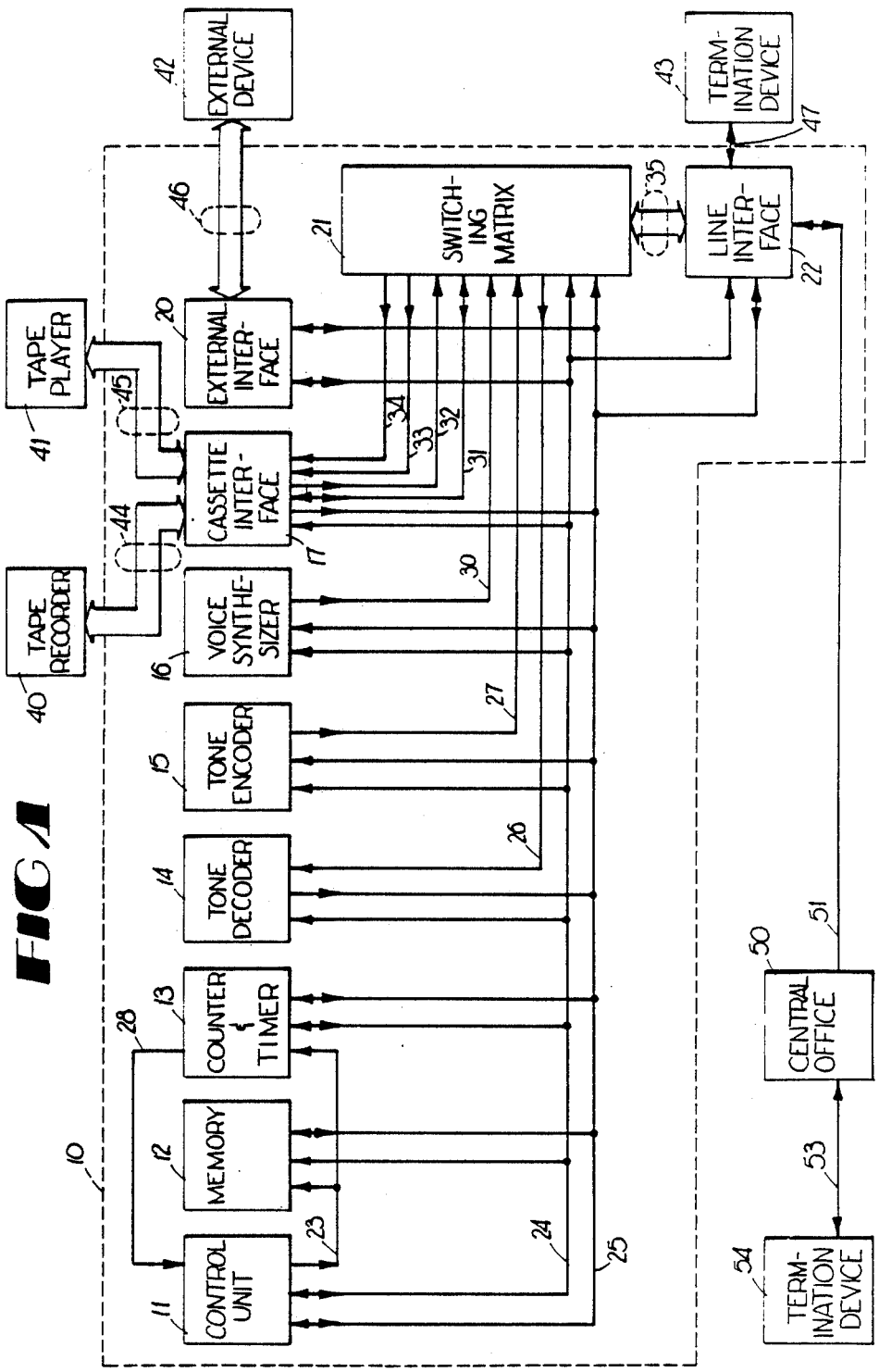
FIG. 1 is a block diagram of the preferred embodiment in a typical operating environment.

Turning now to the drawing in which like numerals reference like components throughout the several figures, the preferred embodiment of the present invention will be described. FIG. 1 is a block diagram of the preferred embodiment 10 of the present invention in a typical operating environment.

The address output of control unit 11 and the address inputs of memory 12 and timer 13 are connected via eight-bit address bus 23. The data inputs and outputs of control unit 11, memory 12, timer 13 and external interface 20, the data inputs of tone encoder 15 and voice synthesizer 16, and the data outputs of tone decoder 14 and line interface 22, are all interconnected via eight-bit data bus 25. The control signal inputs and outputs of control unit 11, timer 13, cassette interface 17, external interface 20, and line interface 22, and the control inputs of memory 12, tone decoder 14, tone encoder 15, voice synthesizer 16, and switching matrix 21 are interconnected by one or more of the plurality of conductors comprising control bus 24.

A first set of the signal inputs and outputs of switching matrix 21 and line interface 22 is connected via signal bus 35, which is comprised of four conductors. A second set of the signal inputs of switching matrix 21 is connected to the outputs of tone encoder 15, voice synthesizer 16 and cassette interface 17, by conductors 27, 30 and 32, respectively. A second set of the signal outputs from switching matrix 21 is connected to the input of tone decoder 14 via conductor 26, and to the inputs of cassette interface 17 via conductors 33 and 34. Finally, a conductor 31 connects a bidirectional input/output port of switching matrix 21 to a bidirectional input/output port of cassette interface 17.

Line interface 22 is connected to the telephone company central office 50 via at least one subscriber line 51, and to a termination device 43 via extension line 47, where lines 47 and 51 each have at least two conductors.

Cassette interface 17 is connected to a cassette tape recorder/playback unit 40 via bus 44, and to a cassette playback unit 41 via bus 45. Buses 44 and 45 are comprised of the plurality of conductors necessary to control the operation of the particular cassette units 40 and 41.

It will be appreciated by one skilled in the art that, except for the interrupt signal from timer 13 on conductor 28, control unit 11 reads or monitors the outputs of memory 12, timer 13, tone decoder 14, and line interface 22 by placing the appropriate signals on address bus 23 and/or control bus 24, thereby causing the selected component 12, 13, 14 or 22 to place its outputs on data bus 25, and then allowing the inputs of control unit 11 to become responsive to signals on data bus 25. It will also be appreciated by one skilled in the art that control unit 11 causes or commands a selected component 12, 13, 14 or 22 to place its output on data bus 25 in the same manner, and commands a selected component 12, 13, tone decoder 15, voice synthesizer 16, switching matrix 21, or line interface 22 to be responsive to signals on data bus 25 in the same manner. It will therefore be understood that control unit 11 commands components 13–17, 21 and 22 to read data words from or write data words into memory 12 by placing appropriate signals on address bus 23 and control bus 24. It will also be understood that control unit 11 may place a data word on data bus 25 and command a selected component to be responsive to that data word.

The term "digit" as used herein refers to the numbers 0 through 9 and the characters * and # on a conventional 3×4 telephone keypad. It will be appreciated that to dial a digit means to place on a conductor the dual tone multiple frequency (DTMF) electrical signal corresponding to that digit.

Memory 12 is comprised of a read only memory (ROM), which contains the operating instructions, and a random access memory (RAM), which is used for the temporary storage of data. The signals placed on address bus 23 and control bus 24 by control unit 11 determine whether a data word is to be read from the ROM or whether a data word is to be read from or written into the RAM.

Timer 13 is a quadruple timer unit, such as the Z80A CTC, currently manfactured by Mostek Corporation as part number MK3882. Timer 13, in response to commands from control unit 11, reads timing parameters from data bus 25 and places data indicating the status of its timers on data bus 25. Timer 13 receives timer triggering signals from cassette interface 17 and line interface 22 via control line 24, sends time-out signals to cassette interface 17 via control bus 24, and sends an interrupt signal to control unit 11 via conductor 28. Each timer in timer 13 can be independently commanded by control unit 11 to begin a timing period in response to a timer triggering signal and to place a time-out signal on conductor 28 at the end of the period. Each timer can also be independently commanded by control unit 11 to increment or decrement its contents in response to a timer triggering signal and place a time-out signal on control bus 24 when its contents are zero or overflow.

Tone decoder 14 receives DTMF electrical signals on conductor 26 and, when commanded by control unit 11, places on data bus 25 a digital word which corresponds to the digit represented by the DTMF electrical signal. It will be appreciated that control unit 11 may command tone decoder 14 to place on data bus 25 a series of digital words which represent the series of digits corresponding to a series of DTMF electrical signals present on conductor 26. Tone decoder 14 is connected to switching matrix 21 via conductor 26. As will be discussed in more detail below, control unit 11 may command line interface 22 and switching matrix 21 to place on conductor 26 the electrical signals present on either subscriber line 51 or extension line 47.

Tone encoder 15, when commanded by control unit 11, will read the digital word present on data bus 25, generate a DTMF electrical signal corresponding to the digit represented by the digital word, and place the DTMF electrical signal onto conductor 27. It will be appreciated that control unit 11 may command tone encoder 15 to read a series of digital words present on data bus 25 and place a series of DTMF electrical signals onto conductor 27. Tone encoder 15 is connected to switching matrix 21 via conductor 27. As will be discussed in more detail below, control unit 11 may command switching matrix 21 and line interface 22 to place this DTMF electrical signal onto subscriber line 51 or extension line 47.

Voice synthesizer 16, when commanded by control unit 11, will read the digital word present on data bus 25, generate an audio electrical signal, and place this signal onto conductor 30. It will be appreciated that in response to an appropriate series of digital words synthesizer 16 will output the sound of a spoken word. In the preferred embodiment of the present invention, the ROM of memory 12 contains a plurality of sets of digital words. Control unit 11 may, therefore, command voice synthesizer 16 to read these words and to place onto conductor 30 a series of electrical signals which correspond to the sound of a voice speaking numbers 0 through 9 and a predetermined number of other vocal words or sounds.

Voice synthesizer 16 is comprised of a conventional digital-to-analog converter (DAC) and other support components. It will be appreciated that using a DAC provides a high-quality human voice sound, but also requires a substantial amount of memory 12 space, thus increasing the total cost of the device 10. In some applications, part or all of the user's voice requirements may be met by a lesser-quality voice, i.e., one which sounds computer-generated. In such applications, voice synthesizer 16 may be comprised of a DAC and/or a phoneme speech synthesizer, plus other support components. One example of a phoneme speech synthesizer is the SSI 263A Phoneme Speech Synthesizer, currently manufactured by Silicon Systems of Tustin, Calif. Using a phoneme speech synthesizer for part or all of the user's requirements will save memory 12 space and lower the cost of the device.

Cassette interface 17 is connected to cassette tape recorder/player unit 40 and cassette tape player unit 41 via tape buses 44 and 45, respectively, to switching matrix 21 via conductors 31, 32, 33 and 34, and to control unit 11 via control bus 24. Cassette interface 17 buffers audio and control signals between cassette units 40 and 41 and switching matrix 21. Cassette interface 17 also buffers control signals between control bus 24 and cassette units 40 and 41. The design of a cassette interface unit 17 will depend upon the characteristics of the particular cassette units 40 and 41 used by the subscriber. It will be understood from the later detailed description of line interface 22 that cassette interface 17 must prevent cassette units 40 and 41 from connecting the system ground of device 10 to an external ground since the system ground is directly connected to the subscriber line 51. Means for accomplishing the above are well known to those skilled in the art. Cassette units 40 and 41 may be embodied by a single cassette unit.

Switching matrix 21, in the preferred embodiment, is constructed from two interconnected 4×4 crosspoint switches such as the Motorola 1452100 or RCA CD22100 devices. Each crosspoint switch has eight bidirectional ports, and one of the ports of the first crosspoint switch is connected to one of the ports of the second crosspoint switch such that the result is equivalent to a 4×7 crosspoint switch. Switching matrix 21 selectively routes audio signals among tone decoder 14, tone encoder 15, voice synthesizer 16, cassette interface 17, and line interface 22 in response to commands from control unit 11. The method by which switching matrix 21 accomplishes routing of audio signals in response to commands from control unit 11 is known to those skilled in the art.

Line interface 22 monitors the electrical signals present on subscriber line 51 and extension line 47 and, in response to commands from control unit 11, places digital status words onto data bus 25. There are two status words. Each status word has a plurality of bits, and each bit represents a specific condition such as: the termination device 43 in on-hook or off-hook, central office 50 is placing a ringing signal on subscriber line 51, termination device 43 is dialing a number by rotary dialing, central office 50 has hung up subscriber line 51, that the characteristics of the electrical signals present on subscriber line 51 or extension line 47 are indicative of a human voice, or a sound other than a human voice, and that certain tones are present.

Line interface 22 receives and buffers electrical signals present on subscriber line 51 and places them on signal bus 35 which is connected to switching matrix 21. Line interface 22 also receives and buffers electrical signals placed on signal bus 35 by switching matrix 21 and then places these electrical signals onto on subscriber lines 51. Line interface 22, also on command by control unit 11, receives and buffers signals from, and places signals onto subscriber line 51 and extenssion line 47. Unless control unit 11 commands the contrary, line interface 22 maintains a connection between subscriber line 51 and extension line 47 so that termination device 43 will receive and originate telephone calls in the normal manner. Line interface 22 also provides operating power to termination device 43 when control unit 11 commands line interface 22 to break the connection. The details of line interface 22 will be described later.

In view of the above description of switching matrix 21 and line interface 22 it will be understood that to "connect" a component to another component, e.g.—termination device 43 to tone decoder 14, and to "route" a signal, e.g.—the output signal of termination device 43 to the input terminal of tone decoder 14, is an unambiguous manner of specifying the operation of line interface 22 and/or switching matrix 21 to obtain a desired result.

External interface 20 is an RS-232 interface to allow the preferred embodiment to communicate with an external device 42 over an external bus 46. The design of interface 20 and the number of conductors in bus 46 will necessarily depend upon the requirements of the external device 42. External interface 20 is connected to control unit 11 via control bus 24 and data bus 25.

As will be apparent from the later discussion of line interface 22, subscriber line 51 is connected to the system ground of the present invention 10. The system ground is therefore necessarily floating with respect to the ground of the local A.C.-power system so as not to unbalance subscriber line 51 and cause a line trouble signal to be generated at central office 50. It will therefore be appreciated that external interface 20 must isolate external bus 46 from the system ground. This is preferably accomplished by means of optocouplers in external interface 20 to isolate bus 46 from buses 24 and 25.

Assume now that the user of the preferred embodiment desires to set the device 10 in a first state so that, in response to an incoming call, it answers the call and plays a message from cassette player 41. This message prompts the calling party to leave a message which is recorded by tape recorder 40. In order to achieve this result, the user will cause termination device 43 to go off-hook, dial a predetermined sequence of digits, and hang up. Termination device 43 is normally a telephone set. Line interface 22 will detect that termination device 43 has gone off-hook. Since the outputs of line interface 22 are monitored by control unit 11, when termination device 43 goes off-hook, control unit 11 will command line interface 22 and switching matrix 21 to connect tone decoder 14 to termination device 43. Tone decoder 14 will then convert the sequence of digits dialed into a series of digital words. Control unit 11 reads the outputs of tone decoder 14 and, if the first digital word output by tone decoder 14 corresponds to a first or a second predetermined digit, e.g., a * or #, then control unit 11 will command line interface 22 to disconnect tone decoder 14 and termination device 43 from subscriber line 51, thereby disconnecting central office 50. Control unit 11 then compares the remainder of the digital words from tone decoder 14 with predetermined code words stored in memory 12.

The preferred embodiment may also be controlled from a remote location at which a telephone set embodies termination device 54. The user first dials the phone number for subscriber line 51. Central office 50 will place a ringing signal on subscriber line 51. Line interface 22 will detect this ringing signal. Control unit 11 will then command line interface 22 to seize (answer) subscriber line 51 and also command line interface 22 and switching matrix 21 to connect tone decoder 14 and voice synthesizer 16, to subscriber line 51. Control unit 11 then commands memory 12 to place a series of digital words onto data bus 25, and commands voice synthesizer 16 to read this series of digital words. This series of digital words causes voice synthesizer 16 to produce a series of tones for a first predetermined amount of time. To the user, this series of tones means that device 10 is responsive to commands from the user. To another calling party, this series of tones merely means that the call has been answered. During the tone sequence, the user than dials a predetermined sequence of digits. Tone decoder 14 will then convert the sequence of digits dialed into a series of digital words. Control unit 11 reads the outputs of tone decoder 14. If the first digit dialed is the first or the second predetermined digit, e.g., a * or a , then control unit 11 will compare the remainder of the digital words from tone decoder 14 with predetermined code words stored in memory 12.

In either case, i.e., regardless of whether the user was using termination device 43 or 54, if the remainder of the digital words matches the proper predetermined code word then, after the active termination device 43 or 54, goes on-hook, control unit 11 places the preferred embodiment in its first defined state and commands line interface 22 and switching matrix 21 to disconnect tone decoder 14 and voice synthesizer 16 from the termination device 43.

Assume now that a calling party other than the owner of the preferred embodiment dials the user's telephone number from another telephone set shown as termination device 54. Control unit 11 causes the incoming call to be answered in the manner described above and then commands voice synthesizer 16 to play the tone sequence. The calling party, not being the user, will normally not dial the first or the second predetermined digit within a first predetermined period of time after subscriber line 51 has been seized. Control unit 11 therefore commands switching matrix 21 to disconnect voice synthesizer 16 and tone decoder 14, and to connect cassette interface 17 to subscriber line 51, and then commands cassette interface 17 to cause cassette tape player 41 to play a prerecorded message to the calling party which prompts the calling party to leave a message.

After the message has been played control unit 11 commands cassette interface 17 to cause tape player 41 to rewind and to cause tape recorder 40 to begin recording the calling party's response. A second predetermined period of time after the record command, or as soon as the calling party hangs up, control unit 11 commands cassette interface 17 to cause tape player 40 to stop recording. Control unit 11 then commands line interface 22 and switching matrix 21 to disconnect cassette interface 17, and subscriber line 51 from each other, and commands line interface 22 to hang up subscriber line 51.

Assume now that the user desires to listen to the responses made by the calling party. The user will cause termination device 43 to go off-hook and dial a different predetermined sequence of digits. Line interface 22 will detect the off-hook condition of termination device 43 and control unit 11 will command line interface 22 and switching matrix 21 to connect tone decoder 14 to termination device 43. Tone decoder 14 converts this predetermined sequence of digits into a series of digital words which are read by control unit 11. If the first digit dialed is the first or second predetermined digit described above, then control unit 11 will command line interface 22 to disconnect tone decoder 14 and termination device 43 from subscriber line 52. Control unit 11 will then continue monitoring the output of tone decoder 14.

Alternatively, if at a remote location, the user can cause termination device 54 to go off-hook and dial the user's telephone number. In this case line interface 22 will detect the predetermined ringing signal. Control unit 11 will command line interface 22 to answer subscriber line 51, command line interface 22 and switching matrix 21 to connect tone decoder 14 and voice synthesizer 16 to subscriber line 51, and command voice synthesizer 16 to play the tone sequence for the first predetermined amount of time. During this time the user will dial the predetermined sequence of digits. Tone decoder 14 converts the predetermined sequence of digits into a series of digital words which are read by control unit 11. If, within the first predetermined amount of time after the answer of subscriber line 51, the first digit dialed was the first or second predetermined digit described above, control unit 11 will continue monitoring the output of tone decoder 14 and will command switching matrix 21 to disconnect voice synthesizer 16 from subscriber line 51.

In either case, control unit 11 then compares the remainder of the digital words from tone decoder 14 with predetermined code words in memory 12. If the remainder matches the appropriate code word then control unit 11 will command switching matrix 21 to connect cassette interface 17 to subscriber line 51, or extension line 47, as appropriate. Depending upon the particular code word dialed, control unit 11 will command cassette interface 17 to cause tape recorder 40 to play back the recorded responses, cause tape player 41 to record a new message, or cause tape recorder 40 and/or tape player 41 to pause, stop, rewind, fast forward, or erase.

The remainder of the digital words may also correspond to a different code word in memory 12 which instructs control unit 11 to place the present invention 10 in one of the different states described below, or to simply cancel operation in the first state. As previously stated, control unit 11 continuously monitors the outputs of line interface 22 so that when the user causes termination device 43 to go on-hook, control unit 11 will, as previously described, command switching matrix 21 and line interface 22 to disconnect any connected components and to reconnect termination device 43 to subscriber line 51. If the user has called from termination device 54 control unit 11 will also command line interface 22 to hang up subscriber line 51.

Assume now that the user desires to set the device 10 in a second operating state so that an incoming call is answered and a prerecorded message from tape player 41 is provided to the calling party. This message prompts the calling party to dial his telephone number and a digit indicating the perceived urgency of his call. The device 10 then stores, in memory 12, the telephone number and urgency code of the calling party. The user places device 10 in a state to respond to incoming calls in this manner by dialing the * or # digit, followed by another predetermined sequence of digits. The operation of device 10 is as described above until the predetermined code is detected.

Assume now that the user has decided to find out if any calling party has left a telephone number for the user to call. In the same manner as previously described, the user causes termination device 43 to go off-hook and dial the appropriate predetermined sequence of digits. Alternatively, the user may cause a remote termination device 54 to go off-hook and then dial the user's telephone number. Then, within the first predetermined amount of time, after the device 10 has answered subscriber line 51, the user dials the appropriate predetermined sequence of digits. This sequence of digits instructs control unit 11 to recall the first message stored in memory 12.

As previously described, voice synthesizer 16 provides an audio output signal in response to a series of digital words. Therefore, the user will hear spoken numbers which corresponds to the digits of the calling party's telephone number, and the urgency code of the call. Control unit 11 will then await further instructions from the user. If the user then dials another predetermined sequence of digits control unit 11 will, in the manner described above, cause the user to be provided with the telephone number and urgency code of the second calling party, and so on until all of the calling party telephone numbers and urgency codes have been provided to the user. Control unit 11 will also cause a predetermined tone burst to be placed on subscriber line 51 or to termination device 43, as appropriate, thus alerting the user that there are no more recorded messages. Control unit 11 will then await further instructions from the user in the form of other predetermined sequences of digits, to replay the messages, erase the messages, or change device 10 to a different state of operation.

The user may also instruct the device 10 to play back the highest priority messages first. If, after dialing the appropriate sequence of digits corresponding to the predetermined code word, the user dials another predetermined sequence of digits control unit 11 will cause the user to be provided, in the same manner described above, the telephone number and urgency code of the calling party with those having the highest urgency level being provided first.

Assume now that the user desires to set the device 10 in a third state of operation so that the device 10 answers an incoming call and plays a prerecorded message to the calling party. This message advises the calling party of a different number where the user can be reached. The user sets the device 10 in this third mode of operation in the same manner previously described, i.e.—causing termination device 43 to go off-hook and dial a predetermined sequence of digits, or causing a remote termination device 54 to go off-hook, dial the user's telephone number and, after answering, dial a predetermined sequence of digits. The user then causes the termination device 43 or 54 to dial another predetermined sequence of digits followed by a sequence of digits corresponding to the telephone number at which he can be reached. Control unit 11 stores the sequence of digits corresponding to the telephone number as digital words in memory 12.

Assume now that a calling party dials the user's telephone number. Control unit 11 will command line interface 22 and switching matrix 21 to connect voice synthesizer 16 to subscriber line 51, and command voice synthesizer 16 to play the tone sequence. If the calling party does not dial the first or second predetermined digit within the first predetermined period of time then control unit 11 will command memory 12 to send a predetermined series of digital words to voice synthesizer 16, and also command voice synthesizer 16 to read this series of digital words from memory 12 and to provide a corresponding audio output signal to subscriber line 51. This audio output signal will be speech which advises the calling party that the user is not currently at the number dialed, but can be reached at a different number. Control unit 11 then reads from memory 12 the sequence of digital words corresponding to the sequence of digits of the different telephone number and provides these to voice synthesizer 16. The calling party will then hear a spoken number corresponding to each of the digits of the telephone number where the user can be reached.

Assume now that the user is serviced by a telephone company central office 50 which provides a call forwarding feature. In order to activate the call forwarding feature, central office 50 typically requires that the user place onto subscriber line 51 a predetermined sequence of digits, typically the digits 73#, followed by a sequence of digits corresponding to the telephone number to which the user desires the calls be forwarded (the destination telephone number), hang up and, if the destination number was busy or did not answer, repeat this sequence. In order to deactivate the call forwarding feature, central office 50 typically requires that the user place onto subscriber line 51 a predetermined sequence of digits, normally the digits 72#, and hang up. In the United States, most offices embodying central office 50 place a burst of the ringing signal on subscriber line 51 in response to each incoming call when the call forwarding feature is active. This burst of the ringing signal is a courtesy "reminder" ring and is typically one-quarter to one-half of a normal ring burst.

The present invention provides apparatus for activating and deactivating central office call forwarding equipment from a remote location. This in turn provides apparatus by which the user may change the destination number without returning to the site at which the preferred embodiment is located.

In the foregoing description of the operation's central office call forwarding equipment, it would be apparent that these sequence of steps which command the central office to initiate and cancel a call forwarding feature must be executed from a termination device connected to the user's subscriber line 51. Once forwarding is initiated, it can only be terminated by execution of the steps defined by the operating company operating central office 50, executed again from a termination device connected to the subscriber's telephone line 51.

The approach of the preferred embodiment of the present invention is to have device 10 detect a predetermined condition which will automatically cause the apparatus to seize subscriber line 51 and place the sequence of DTMF digits on the line which deactivates the forwarding feature. Once this has been accomplished, incoming calls from remote locations to subscriber line 51 can be answered in a normal fashion. This allows the user to then reactivate the call forwarding feature to a different destination number.

Naturally, all of the steps described below for operating the call forwarding control features of the present invention may be executed from the local termination device 43. Control unit 11 monitors the status and output of termination device 43. The user may therefore use termination device 43 to directly activate the call forwarding feature. In this case control unit 11 will recognize that the call forwarding feature has been activated and will respond to the reminder rings as described below. Alternatively, the user may use termination device 43 to instruct control unit 11 to perform the steps necessary to activate the call forwarding feature and to respond to the reminder rings as described below. However, the primary utility of this aspect of the present invention is the remote activation and cancellation of the call forwarding feature.

As in its other states of operation, the preferred embodiment employs tone decoder 14, tone encoder 15, switching matrix 21, counter timer 13 and line interface 22 to implement the process described herein.

Upon receipt of an incoming call, control unit 11 causes the preferred embodiment to provide the predetermined time window for the user to dial digits indicating that a predetermined sequence of digits constituting a command to the preferred embodiment will follow. Assume for the moment that call forwarding is inactive and the user is at a remote number which he wishes to define as the destination number when the call forwarding feature is activated. The predetermined sequence indicating that the digits to follow are the destination number and that call forwarding is to be activated are provided by the user. This information is stored and, upon termination of the call, control unit 11 causes the apparatus to execute the following steps. Line interface 22 goes off-hook and the predetermined code recognized by the central office (73#) is provided over the line, followed by the digits corresponding to the destination number. The apparatus then hangs up, reseizes the line, and again dials the digits corresponding to the destination number. In other words, after receiving the command to initiate forwarding to a predetermined destination number, the device will seize subscriber line 51 and execute the same sequence of steps that a subscriber using a normal telephone on a line with the call forwarding feature would execute.

In the absence of the preferred embodiment, once the call forwarding feature is activated it can only be deactivated by operation of the device connected to subscriber line 51. However, the present invention provides apparatus which will automatically cancel the call forwarding feature in response to detection of a predetermined condition.

In the preferred embodiment, the predetermined condition is a receipt of N calls within a predetermined time period P. After control unit 11 has successfully caused the apparatus to initiate the call forwarding feature, it is then operating the apparatus in a state corresponding to the call forwarding feature being active. Therefore, the unit is the state in which it is waiting to detect occurrence of the predetermined deforwarding condition. Line interface 22 is responsive to detection of ring signals on subscriber line 51. Therefore, control unit 11 will count and store the number of the reminder ring bursts which occur on the line during a predetermined time defined by counter timer 13. In the preferred embodiment, this is a moving time window. Therefore counter timer 13 may either concurrently keep track of several timing periods, or information concerning the elapsed time from receipt of the first reminder ring burst after the call forwarding active state has been entered may also be stored in memory. Each time another reminder ring burst is detected, the control unit 11 will check all stored times of occurrence of the reminder ring burst to see if the condition of a predetermined number N of the bursts occurring within time period P has occurred.

The preferred embodiment provides default values for N and P but these may also be set by the user.

Naturally, this arrangement is one for which unintentional deforwarding can occur if the user's telephone number receives an abnormally large number of calls within a short period of time. However, in using practical embodiments of the present invention, the user will be familiar enough with his or her normal call receipt rate so that N and P may be selected to define a number of calls per unit time which is (a) and likely to occur in response to the normal incoming call traffic to the user's line; and (b) does not represent such a high density of calls that the appropriate number cannot be made within time period P by the user in order to force deactivation remotely. For example, if N is chosen to be 3 and P is chosen as a ninety second period, this may represent an unlikely occurrence in response to the user's normal calls received from third parties. However, when the user is at a remote location corresponding to the destination telephone number, and wishes to change the destination number to a new number, the user will execute the following steps. First, the user'-number is dialed. If the call forwarding feature has already been deactivated because of an unusually large number of third parties dialing the user's telephone number, the user will receive the above described tone bursts indicating that incoming calls are being answered by the preferred embodiment. When this occurs, the user can either play back any messages which may have been left, or command the preferred embodiment to forward calls to the new destination number.

Assuming the more likely occurrence, that forwarding is still in effect, the user simply dials his or her subscriber telephone number up to N times within the predetermined period and deforwarding is accomplished. When the number of forwarded third party calls plus the number of times the subscriber has dialed his or her own telephone number equals N, then the present invention will, as described below, deactivate the central office call forwarding feature. The next time the user dials a number the call will then be answered by the preferred embodiment. The user will then dial the predetermined sequence of digits commanding the preferred embodiment to accept the following sequence of digits as a new destination number and to activate the central office call forwarding.

In response to receipt of N reminder ring bursts within time period P the preferred embodiment seizes line 51 and provides to the central office the predetermined sequence of digits (normally 72#) to deactivate the call forwarding. Control unit 11 then forces the preferred embodiment into its state in which it is awaiting to receive incoming calls. Naturally, if the user wishes to place the apparatus in another state of answering calls, he or she may do so as described hereinabove.

Assume now that the user desires to set the device 10 in a state of operation so that the device 10 will originate calls to predetermined telephone numbers, wait for an answer, play a prerecorded message, and then hang up. The user will, as described previously, cause termination device 43 or 54, as appropriate, to now dial a predetermined sequence of digits and hang up. Control unit 11 will detect the off-hook condition or ringing signal, detect the digits dialed, all in the manner previously described, and place the device 10 into the sixth state of operation.

Control unit 11 will then command line interface 22 to seize subscriber line 51, command line interface 22 and switching matrix 21 to connect tone encoder 15 to subscriber line 51. Memory 12 and tone encoder 15 then place onto subscriber line 51 a sequence of digits corresponding to the first predetermined telephone number to be called. Control unit 11 then commands line interface 22 and switching matrix 21 to disconnect tone encoder 15 from subscriber line 51.

Control unit 11 then monitors the output of line interface 22 for the presence of a human voice, which indicates that the called party has answered. If the called party has not answered within a predetermined amount of time, control unit 11 commands line interface 22 to hang up subscriber line 51. This sequence is then repeated for the second predetermined telephone number to be called, then the third, and so on. However, if the called party answers, line interface 22 will detect the presence of speech on the line. Control unit 11 will then command switching matrix 21 to disconnect tone encoder 15 from subscriber line 51. Control unit 11 will then, in accordance with the user's prior instruction command switching matrix 21 to connect subscriber line 51 to a human operator at termination device 43, or connect cassette interface 17 to subscriber line 51. If the latter, control unit 11 will then command cassette interface 17 to cause cassette tape player 41 to place a prerecorded message on subscriber line 51. When the prerecorded message is finished, when termination device 43 goes on-hook, or when the called party hangs up, whichever occurs first, control unit 11 commands, as appropriate, cassette interface 17 to cause tape player 41 to rewind, commands switching matrix 21 to disconnect cassette interface 17, and commands line interface 22 to hang up subscriber line 51. Control unit 11 then advances to the next predetermined telephone number.

Assume now that the user has not instructed the device 10 to perform any functions; the device 10 will therefore be in its default operation state. If the user desires to place the device 10 in any of its operational states, the user may do so by using termination device 43 in the manner previously described. The user may also place the device 10 in any of its operational states by using a remote termination device 54. The user will dial the user's telephone number. If the call is not been answered by a person using termination device 43 after a predetermined number of ringing signals, control unit 11 will command line interface 22 to answer the call by seizing subscriber line 51. Control unit 11 then places a brief answer acknowledgment tone on subscriber line 51. Control unit 11 then monitors the output of tone decoder 14. The user can then place the device 10 in any of its operational states in the manner previously described. Control unit 11 will cause line interface 22 to hang up subscriber line 51 if a valid command is not received within the predetermined amount of time or if central office 50 disconnects subscriber line 51.

It will be appreciated that the user can prevent unauthorized tampering with the device 10 by requiring that the calling party provide, by DTMF dialing, a security code before control unit 11 will be responsive to any commands. It will also be appreciated that the device 10 also has other advanced telephone features such as last number redial and speed dialing from a bank of telephone numbers stored in memory 12.

The foregoing has been a description of the operation of the preferred embodiment in connection with the block diagram of FIG. 1. The following descriptions of the apparatus shown on the other drawing figures show circuit details of the preferred embodiment.

Figure 2:
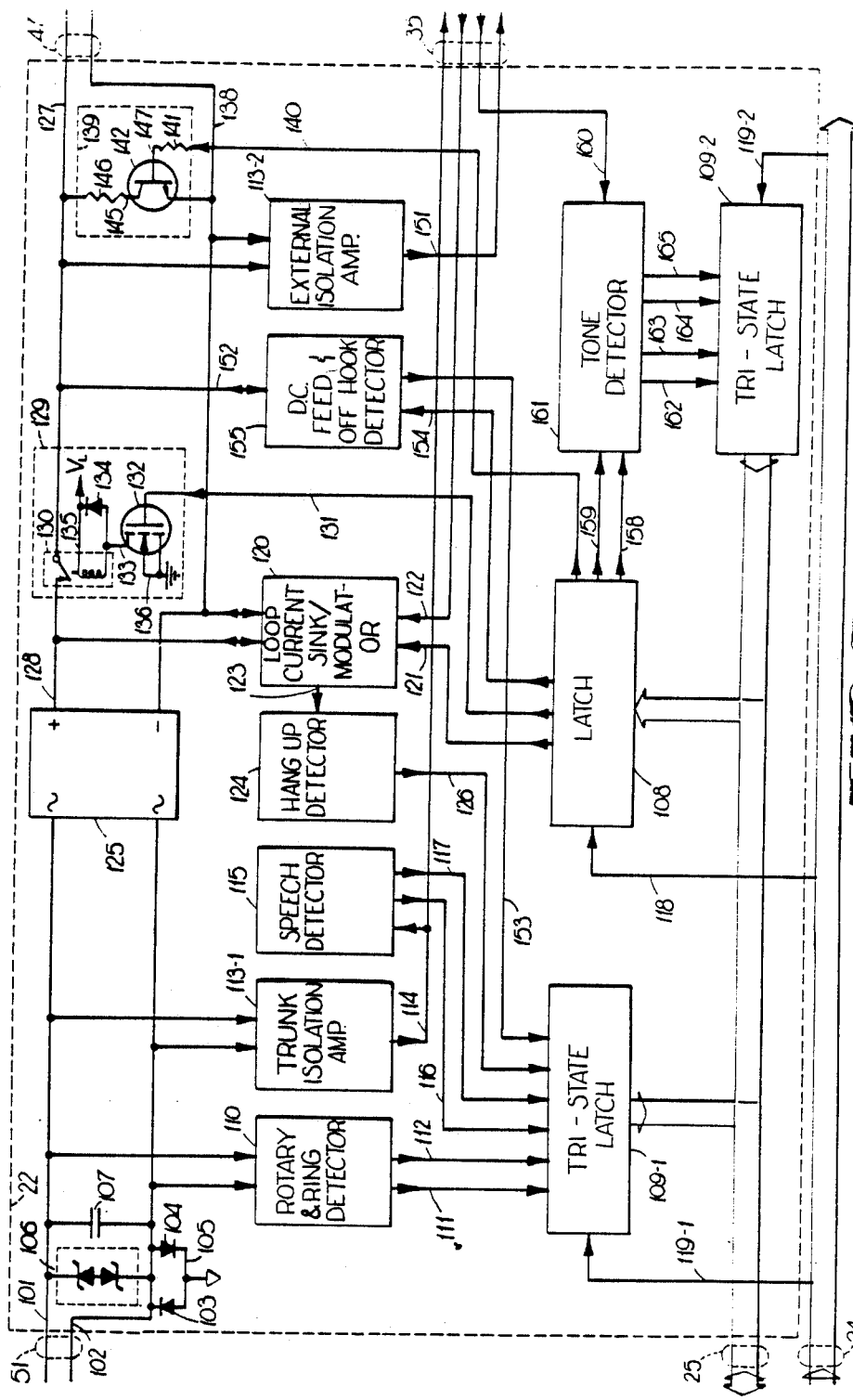
FIG. 2 is a diagram of the telephone line interface circuit.

Turn now to FIG. 2 which is a diagram of the line interface 22. The arrows superimposed on the conductors are indicative of the direction of signal flow on the conductor. It will be appreciated that some conductors have bidirectional signal flow.

Line interface 22 is a tranformerless line interface and comprises a voltage suppressor 106, a noise suppressor capacitor 107, two system ground reference diodes 103 and 104, a rotary/ring detector 110, two isolation amplifiers 113, a speech detector 115, a loop current sink/modulator 120, a hangup detector 124, a line connection circuit 130, a muting circuit 139, a DC feed/off-hook detector 155, an input latch 108, two output latches 109, a full-wave bridge rectifier 125 and a tone detector 161. Line interface 22 is connected to subscriber line 51, extension line 47, control bus 24, data bus 25, and signal bus 35.

Subscriber line 51 comprises two conductors, commonly referred to as the central office tip 101 and the central office ring 102. A surge voltage suppressor 106 is connected between conductors 101 and 102 to limit the voltage between these conductors to a predetermined safe value. Capacitor 107 is connected between conductors 101 and 102 to suppress high frequency noise. System ground references diodes 103 and 104 are connected, in parallel, but with opposite electrical orientation, between conductor 102 and, via conductor 105, system ground. Diodes 103 and 104 therefore allow electrical signals on conductor 101 to be referenced to system ground.

The data inputs of latch 108 are connected to data bus 25, and the gating input is connected to control bus 24 via conductor 118. The data outputs of latch 108 are connected to the inputs of loop current sink/modulator 120, line connector 129, DC feed and off-hook detector 155, muting circuit 139, and the two inputs of tone detector 161 by conductors 121, 131, 154, 140, and 158 and 159, respectively. It will be appreciated that control unit 11 controls the operation of components 120, 129, 155, 139, and 161 by first placing data on data bus 25, and then placing a gating signal on conductor 118 of control bus 24. This causes latch 108 to read and store the data present on data bus 25 and place this data on it outputs.

The data inputs of tri-state latch 109-1 are connected to the outputs of rotary/ring detector 110 by conductors 111 and 112, to the outputs of speech detector 115 by conductors 116 and 117, to the output of hangup detector 124 by conductor 126, and to the output of DC feed and off-hook detector 155 by conductor 153. The data inputs of tri-state latch 109-2 are connected to the outputs of tone detector 161 by conductors 162, 163, 164 and 165. The control inputs of latches 109-1 and 109-2 are connected to control bus 24 by conductors 119-1 and 119-2, respectively. The outputs of latches 109-1 and 109-2 are connected to data bus 25. It will therefore be appreciated that control unit 11 reads the outputs of components 110, 115, 124, 155 and 161 by placing a control signal on conductor 119-1 or 119-2, as appropriate, thereby causing latch 109-1 or 109-2 to place its outputs on data bus 25. Control unit 11 then reads the data present on data bus 25.

Conductor 101 of subscriber line 51 is connected to one of the AC inputs of the full-wave bridge rectifier 125, and conductor 102 is connected to the other AC input of bridge rectifier 125. The positive output terminal of bridge rectifier 125 is connected to conductor 128 and the negative output terminal is connected to conductor 138. Bridge rectifier 125 therefore changes the battery, reverse battery, and ringing signals placed on subscriber line 51 by central office 50 into a unipolar DC signal for the operation of loop current sink and modulator 120, DC feed and off-hook detector 155, and muting circuit 139.

Line connector 129 comprises an insulated gate field effect transistor 132, a diode 134, and a relay 130. The gate of transistor 132 is connected to one of the outputs of latch 108 by conductor 131, the substrate and source are connected to system ground by conductor 136, and the drain is connected by conductor 133 to one end of the parallel circuit of diode 134 and the coil of relay 130. The other end of this parallel circuit is connected by conductor 135 to the system logic power supply VL. The cathode of diode 134 is connected to conductor 135 and the anode is connected to conductor 133 so that diode 134 suppresses voltage and current surges from the coil of relay 130. Relay 130 is a single-pole, single-throw normally closed relay. One contact point of relay 130 is connected to conductor 128 and the other contact point is connected to conductor 127. Extension line 47 comprises conductor 127 and 138. It will therefore be appreciated that line connector 139 connects and disconnects subscriber line 51 and extension line 47 by connecting and disconnecting conductors 128 and 127.

It will be understood that when the appropriate output of latch 108 places on conductor 131 a positive voltage greater than the threshold voltage of transistor 132, transistor 132 will turn on, thereby allowing current to flow from the system logic power supply through the coil of relay 130 and transistor 132 to system ground, thereby causing relay 130 to open its contacts and disconnnect conductor 128 from conductor 127.

Muting circuit 139 comprises transistor 142 and resistors 141 and 146. Conductor 127 is connected to conductor 138 by the series combination of resistor 146, conductor 145, and the collector and emitter of transistor 142. The base of transistor 142 is connected to one of the outputs of latch 108 by the series combination of conductor 147, resistor 141, and conductor 140. It will be understood that when the appropriate output of latch 108 places on conductor 140 a voltage greater than the threshold voltage of transistor 142, transistor 142 will be turned on. This effectively shorts conductors 127 and 138 together and mutes all electrical signals on this pair of conductors.

Figure 3:
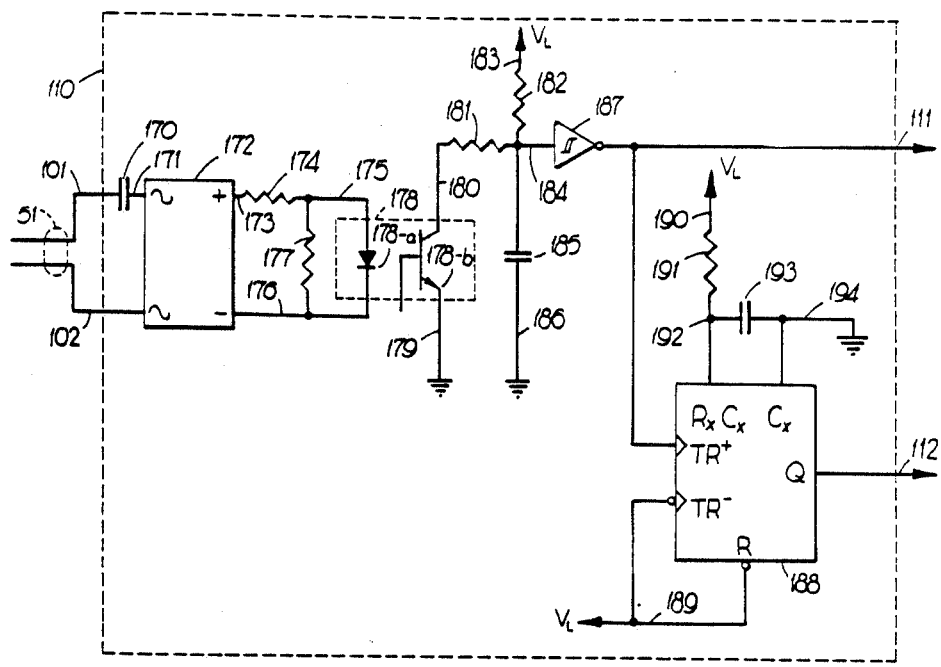
FIG. 3 is a schematic diagram of a rotary pulse and ring detector.

FIG. 3 is a schematic diagram of rotary/ring detector 110. Conductor 101 of subscriber line 51 is connected to one terminal of a DC blocking capacitor 170. The other terminal of capacitor 170 is connected by conductor 171 to one of the AC inputs of the full-wave bridge rectifier 172. Conductor 102 is connected to the other AC input of bridge rectifier 172.

It will be appreciated that the purpose of capacitor 170 is to block the DC battery voltage provided by central office 50 and to pass AC signals such as rotary dial pulses and ringing signals. The positive output terminal of bridge rectifier 172 is connected to the negative output terminal of rectifier 172 through the series combination of conductor 173, resistor 174, conductor 175, the parallel circuit of resistor 177 and the diode 178-$a$ of optocoupler 178, and conductor 176. The cathode of the diode 178-$a$ of optocoupler 178 is connected to conductor 176 and the anode is connected to conductor 175.

It will be appreciated by one skilled in the art that optocoupler 178 typically comprises a light emitting diode 178-$a$ and a transistor 178-$b$ and that the transistor 178-$b$ becomes conductive whenever a current greater than a predetermined threshold current flows through the diode 178-$a$. It will therefore be appreciated that the values of resistors 174 and 177 are not critical but resistor 174 must be sufficiently large and resistor 177 must be sufficiently small to prevent loading of subscriber line 51 and excessive current flow through the diode 178-$a$. Also, resistor 174 must be sufficiently small and resistor 177 must be sufficiently large to permit sufficient current to flow through the diode 178-$a$ to reliably cause transistor 178-$b$ to become conductive.

The emitter of transistor 178-$b$ is connected to the system ground by conductor 179. The collector of transistor 178 is connected to one end of resistor 181 by conductor 180. The other end of resistor 181 is connected by conductor 184 to one end of resistor 182, to one end of capacitor 185, and to the input of the schmitt-trigger inverter 187. The other end of resistor 182 is connected to the system logic voltage supply VL by conductor 183. The other end of capacitor 185 is connected to the system ground by conductor 186. The output of inverter 187 is connected by conductor 111 to the positive-going input trigger of monostable 188 and also to one of the data inputs of latch 109-1.

It will be appreciated that components 181, 182 and 185 form a low pass filter with its output on conductor 184. This filter passes rotary pulse and ringing information but attenuates higher frequency audio and tone signals. Schmitt trigger inverter 187 provides an output waveform with fast transition times and also provides hysteresis to eliminate random transitions caused by noise when the signal is near the trigger threshold point. It will be understood that the values of component 181, 182, and 185 are not critical but must be selected so that the current rating of transistor 178-b is not exceeded, rotary pulses and ringing signals are passed, and higher frequency audio and tone signals are not passed. The signal on conductor 111 will therefore be a digital signal with a waveform corresponding to the shape of the envelope of the rotary pulse or ringing signals.

The output of inverter 187 is also connected by conductor 111 to the positive trigger input of one-shot 188. One-shot 188 is a precision retriggerable monostable multivibrator such as the Motorola MC 14538B or the RCA 4538. The negative trigger input and the negated reset input of one-shot 188 are connected to the system logic power supply VL by conductor 189. One-shot 188 places its Q output on conductor 112 which is connected to one of the data inputs of latch 109-1. The Cx input of one-shot 188 is connected by conductor 194 to the system ground and to one end of timing capacitor 193. The RxCx input is connected by conductor 192 to the other end of timing capacitor 193 and to one end of timing resistor 191. The other end of timing resistor 191 is connected by conductor 190 other system logic supply VL.

Resistor 191 has a nominal value of 22.1 Kohms, ±1%, and capacitor 193 has a nominal value of 1.5 microfarads, ±10%, so that the period of the output pulse on line 112, if one-shot 188 is not retriggered, is approximately 33 milliseconds. As will be known by those skilled in the art, a typical ringing signal comprises repeated two-second bursts of a 18 Hz to 33 Hz signal, and a typical rotary dial signal comprises a series of pulses, the rising and falling edge of each pulse being typically separated by 0.06 second. It will therefore be appreciated that capacitor 170 and bridge rectifier 172 cause inverter 187 to place a pulse onto conductor 111 for each half-cycle of the 20 Hz nominal ringing signal and for both the rising and falling edges of each pulse of the rotary dial signal, thereby effectively doubling the frequency of these signals.

Since one-shot 188 has an unretriggered output pulse width of thirty three milliseconds it will be appreciated that the ringing signal will keep one-shot 188 retriggered for the entire duration of each two-second burst. It will also be appreciated that the rotary dial signal will not keep one-shot 188 retriggered so one-shot 188 will place on conductor 112 a series of thirty-three millisecond pulses. Control unit 11 therefore distinguishes a ringing signal from a rotary dial signal by measuring the duration of the output of one-shot 188.

Control unit 11 also distinguishes ringing signals and rotary dial signals from noise impulses ("glitches") by measuring the period between output pulses placed on conductor 111 by inverter 187. It will be appreciated that the combination of capacitor 170 and bridge rectifier 172 causes the LED/178-a of optical coupler 178 to flash twice for each glitch, once for the leading edge of the glitch and once for the trailing edge, thereby causing inverter 187 to place two output pulses on conductor 111. It will further be appreciated that, by definition, a glitch is of a very short duration so the two output pulses on conductor 111 will be spaced closely together. However, the output pulses on conductor 111 for a rotary dial signal will be separated by a substantially longer period of time, typically 0.07 second. A glitch will therefore cause two closely-spaced narrow pulses on conductor 111 and a slightly extended thirty-three millisecond pulse on conductor 112.

A rotary dial signal will cause, for each rotary dial pulse, two narrow pulses, separated by approximately 0.06 second, on conductor 111, and two thirty-three millisecond pulses, their leading edges separated by approximately 0.06 second, on conductor 112. Each burst of the ringing signal will cause a two-second series of output pulses on conductor 111, and a single output pulse, with a duration of slightly over two seconds, on conductor 112.

The "reminder" ringing signal when the call forwarding feature is activated is typically a single, one-quarter burst of a ringing signal. A reminder ringing signal will therefore cause a one-half second series of pulses on conductor 111 and a single, approximately one-half second, pulse on conductor 112. By measuring the duration and repetition rate of the pulses on conductors 111 and 112 control unit 11 can distinguish between a glitch, a rotary dial signal, a ringing signal, and a reminder ringing signal. Methods of measuring the duration an repetition rate of the output pulses are well known to those skilled in the art and are not detailed herein.

Figure 4:
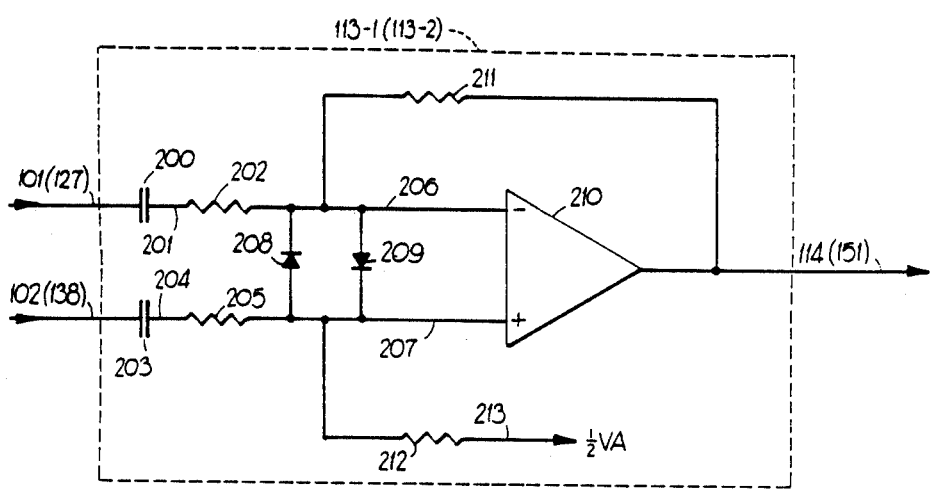
FIG. 4 is a schematic diagram of an isolation amplifier.

FIG. 4 is a schematic diagram of isolation amplifier 113 (113-1 and 113-2). Isolation amplifier 113-1 isolates and buffers signals on subscriber line 51, and amplifier 113-2 isolates and buffers signals on extension line 47. The inverting input of high-gain amplifier 210 is connected to conductor 101 (127) by the series of capacitor 200 and resistor 202, to the output of amplifier 210 on conductor 114 (151) by negative feedback resistor 211, and to the non-inverting input of amplifier 210 by two reverse-oriented diodes, 208 and 209. The non-inverting input of amplifier 210 is connected to conductor 102 (138) by the series combination of capacitor 203 and resistor 205, to a voltage reference of one-half of the system analog power supply voltage VA by resistor 212, and to the inverting input of amplifier 210 by diode 208 and 209, as described above. Capacitors 200 and 203 are D.C. blocking capacitors. Resistors 202, 205, 211 and 212 set the gain of amplifier 210, and also set the no-input-signal output voltage of amplifier 210 at approximately one-half of the system analog power supply voltage. Diodes 208 and 209 protect the inputs of amplifier 210 by limiting the voltage between these inputs. The output of isolation amplifier 113-1 is connected to the input of speech detector 115 and to signal bus 35 by conductor 114. The output of isolation amplifier 113-2 is connected to signal bus 35 by conductor 151. The principles of operation of isolation amplifier 113 are well known.

The input of speech detector 115 is connected to the output of isolation amplifier 113-1 by conductor 114. The outputs of speech detector 115 are connected to the appropriate data inputs of output latch 109-1 by conductors 116 and 117. The operation of speech detector 115 is discussed in detail in U.S. Pat. No. 4,477,698 which is assigned to the asignee of the present invention.

Figure 5:
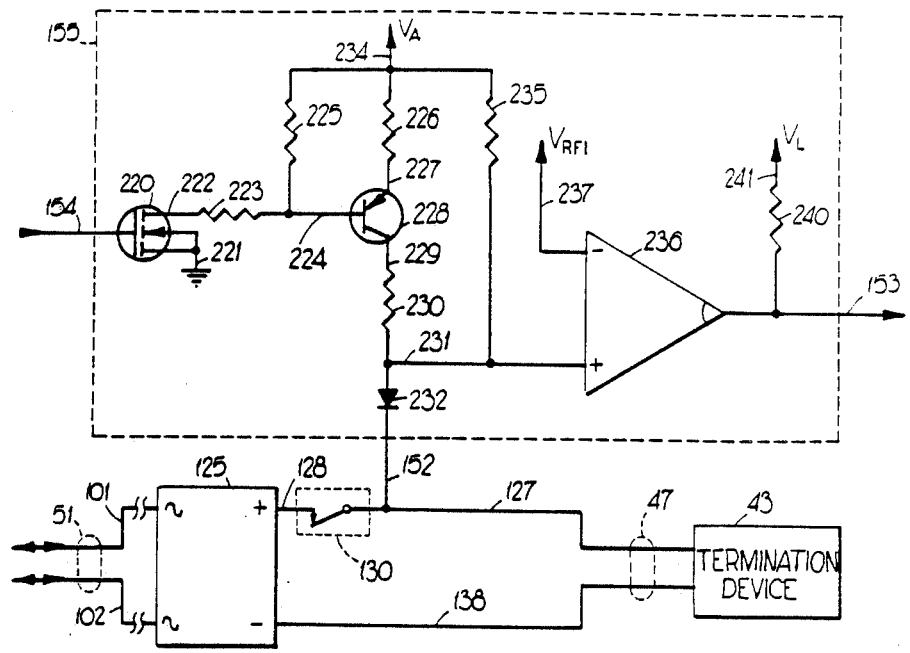
FIG. 5 is a schematic diagram of a DC feed and off-hook detector.

Turn now to FIG. 5 which is a schematic diagram of DC Feed and off-hook detector 155. Off-hook detector 155 places its output on conductor 153 to indicate whether termination device 43 is on-hook or off-hook. Conductor 153 is connected to one of the data inputs of latch 109-1. Conductor 154 connects one of the data outputs of latch 108 to the gate of insulated gate field effect transistor 220. The source and substrate of transistor 220 are connected to system ground by conductor 221. The base of PNP transistor 228 is connected to the drain of transistor 220 by resistor 223, and to the system analog power supply VA by resistor 225. The emitter of transistor 228 is connected to the system analog power supply by resistor 226. Those skilled in the art will recognize the combination of resistors 223, 225 and 226 and transistor 228 as a constant-current source with its output as the collector of transistor 228 and will also recognize that this constant-current source is turned on or off by transistor 220, which is turned on or off by electrical signals on conductor 154. The collector of transistor 228 is connected to one end of resistor 230 by conductor 229. The other end of resistor 230 is connected to the anode of diode 232, to one end of resistor 235, and to the non-inverting input of open-collector comparator 236 by conductor 231. The other end of resistor 235 is connected to the system analog power supply VA by conductor 234. The cathode of diode 232 is connected by conductor 152 to conductor 127 of extension line 47. The inverting input of comparator 236 is connected to a reference voltage (VRF1) by conductor 237. In the disclosed device 10 voltage VRF1 is 10 volts. The output of comparator 236 is connected to one end of a pull-up resistor 240, and to one of the data inputs of latch 109-1 of FIG. 2 by conductor 153.

Assume first that the contacts of relay 130 are closed, that transistors 220 and 228 are turned off, and that central office 50 of FIG. 1 has placed battery voltage on subscriber line 51. If termination device 43 is on-hook no current will flow through it and the voltage on conductor 127 will be the central office 50 battery voltage, which is greater than the system analog power supply voltage VA. Diode 232 will therefore be reverse biased and resistor 235 will pull conductor 231 up to the system analog power supply voltage VA. Voltage VA is greater than reference voltage VRF1 so the output of comparator 236 will be open and conductor 153 will be pulled to the logic power supply voltage VL, which is a logical 1, by resistor 240 thereby indicating that termination device 43 is on-hook.

Alternatively assume now that the contacts of relay 130 are open and that transistors 220 and 228 are turned on. If termination device 43 is on-hook no current will flow through it and the voltage on conductors 127 and 231 will approximate the system analog power supply voltage VA. As previously stated, voltage VA is greater than voltage VRF1 so the output of comparator 236 will be open, and conductor 153 will be pulled to a logical 1 by resistor 240, thereby indicating that termination device 43 is on-hook.

In either case, whenever termination device 43 now goes off-hook it will sink a sufficient amount of current to cause the voltage on conductor 127 to fall to a value under 9 volts. Diode 232 will now be forward biased so the voltage on conductor 231 will fall to a value equal to the voltage on conductor 127 plus the forward voltage drop of diode 232. The voltage on conductor 231 will now be less than VRF1. Comparator 236 will then pull conductor 153 down to system ground, which is a logical 0, thereby indicating that termination device 43 is off-hook.

It will be recalled that, if the first digit dialed from termination device 43 after it goes off-hook is a * or a #, then control unit 11 will cause relay 130 to open, thereby disconnecting termination device 43 from operating power supplied by the central office 50. In this case control unit 11 will cause a logical 1 to be placed on conductor 152, thereby turning on transistors 220 and 228, and providing operating power to termination device 43 from the system analog power supply.

Figure 6:
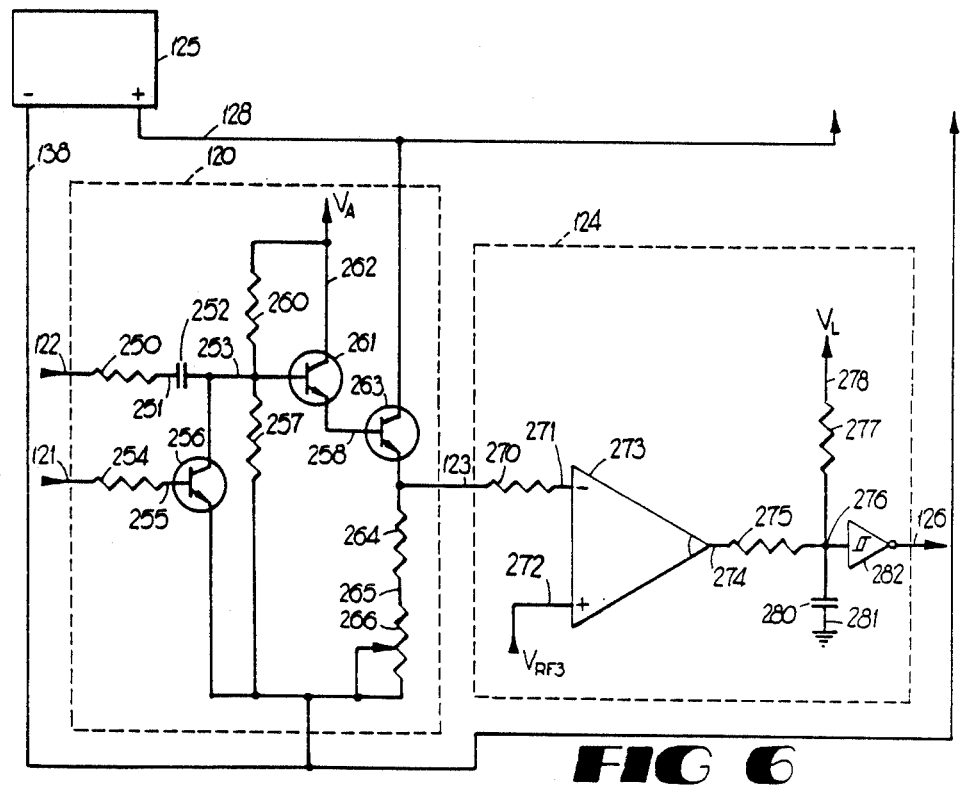
FIG. 6 is a diagram of a loop current sink/modulator and a hang-up detector.

Turn now to FIG. 6 which is a schematic diagram of loop current sink/modulator 120 and hang-up detector 124. One of the data outputs of latch 108 is placed onto conductor 121, which is connected to the base of transistor 256 through the series combination of resistor 254 and conductor 255. Resistor 254 limits the base current of transistor 256 to a predetermined safe value. The emitter of transistor 256 is connected to conductor 138. The base of transistor 261 is connected by conductor 253 to conductor 138 through resistor 257, to the analog power supply voltage (VA) through resistor 260, to the collector of transistor 256, and to conductor 122 through the series combination of capacitor 252, conductor 251, and resistor 250. Conductor 122 is one of the conductors of signal bus 35. The collector of transistor 261 is connected to the analog power supply voltage (VA) by conductor 262. The emitter of transistor 261 is connected to the base of transistor 263 by conductor 258. The collector of transistor 263 is connected to conductor 128, and the emitter is connected to conductor 138 through the series combination of conductor 123, resistor 264, conductor 265 and potentiometer 266. It will be recognized that transistors 261 and 263 comprise a Darlington emitter follower circuit.

If conductor 121 has a logical 1 voltage on it, representing a signal to release subscriber line 51, transistor 256 will be turned on (placed in a conducting, saturated state), effectively shorting together conductors 253 and 138, which turns off transistors 261 and 263, thereby presenting an open circuit between conductors 128 and 138. It will be appreciated that central office 50 interprets an open circuit as an on-hook condition. A logical 1 on conductor 121 therefore hangs up subscriber line 51.

Conversely, if conductor 121 has a logical 0 voltage on it, representing a signal to seize and hold subscriber line 51, transistor 256 will be turned off and conductor 253 will rise to a voltage (VB) determined by resistors 257 and 260. This predetermined voltage (VB) biases transistors 261 and 263 in a linear operating region. Transistor 263 therefore allows current to flow from conductor 128 to conductor 138. The amount of current flowing is determined by the voltage on conductor 253 and by resistor 264 and potentiometer 266. Potentiometer 266 is adjusted so that the amount of current flowing from conductor 128 to conductor 138 is sufficient to cause central office 50 to detect an "off-hook" condition. Resistor 264 limits the current flowing through transistor 263 to a safe value in the event that potentiometer 266 is turned too far toward the zero-resistance position.

The purpose of resistor 250, capacitor 251, and the linear region operation of transistors 261 and 263 will now be explained. When the signal on conductor 121 is a logical 0 voltage, conductor 253 rises to voltage VB. If an audio signal is now placed on conductor 122, voltage VB will be modulated by the audio signal, therefore modulating the current flowing from conductor 128 to conductor 138 through transistor 263, and thereby placing the audio signal on subscriber line 51. Capacitor 252 prevents DC voltages on conductor 122 from biasing transistors 261 and 263 into a non-linear operating region. Resistor 250 protects the source which drives conductor 122 in the event that transistor 256 is turned on. It will now be appreciated that loop current sink/modulator 120 can be commanded by signals on conductor 121 to seize and hold or to release subscriber line 51, and that audio signals on conductor 122 appear as audio signals on subscriber line 51.

Referring to FIG. 1, it will also be appreciated that control unit 11 causes the outputs of tone encoder 15, voice synthesizer 16, and cassette tape player 41 to be placed on subscriber line 51 by causing their outputs to be placed, via switching matrix 21, onto conductor 122. It will also be appreciated that rotary dialing is accomplished by placing a series of logical 0 and logical 1 signals on conductor 121 so that transistor 263 alternately conducts/does not conduct current from conductor 128 to conductor 138, thereby performing the make/break function required for rotary dialing.

Returning to FIG. 6, the operation of hangup detector 124 will be explained. The emitter of transistor 263 is connected by the series combination of conductor 123, resistor 270, and conductor 271 to the inverting input of open collector comparator 273. The non-inverting input of comparator 271 is connected by conductor 272 to a reference voltage, VRF3. If loop current sink/modulator 120 has been commanded by control unit 11 to seize/hold subscriber line 51, transistor 263 will be conducting current from conductor 128 to conductor 138 through resistor 264 and potentiometer 266, thereby causing a voltage drop (Vc) across resistor 264 and potentiometer 266. This voltage (Vc) will appear on conductor 123 and, being greater than voltage VRF3, will cause comparator 273 to pull conductor 274 down to the system ground.

If determination device 54 in FIG. 1 hangs up, central office 50 will momentarily disconnect subscriber line 51, thereby interrupting the current through transistor 263, resistor 264, and potentiometer 266. This causes voltage Vc on conductor 123 to fall below VRF3, and causes the output of open-collector comparator 273 to become an open circuit and release conductor 274. Conductor 274 connects the output of comparator 273 to one end of resistor 275. The other end of resistor 275 is connected by conductor 276 to the system logic supply (VL) through resistor 277 and conductor 278, to the system ground through capacitor 280 and conductor 281, and to the input of schmitt inverter 282. The output of inverter 282 is placed on conductor 126.

It will be appreciated that when the output of comparator 273 is open resistor 277 pulls conductor 276 up to a logical 1, thereby causing inverter 282 to place a logical 0 on conductor 126. However, when the output of comparator 273 is the system ground, conductor 276 is pulled down to a logical 0, capacitor 280 is discharged through the output transistor of comparator 273 and the output of inverter 282 is a logical 1. Capacitor 280 and resistors 275 and 277 form a low-pass filter and are selected so that audio signals and rotary dial pulses do not cause inverter 282 to change states. The value for resistor 275 is also selected so as to prevent damage to the output transistor of comparator 273 from excessive current flow when capacitor 280 is discharged.

It will now be appreciated that when subscriber line 51 is active and loop current sink/modulator 120 is seizing or holding subscriber line 51, the voltage on conductor 123 will be greater than VRF3, the output of comparator 273 will be the system ground, and the output of inverter 282 will be a logical 1. Conversely, when termination device 54 hangs up, central office 50 will interrupt the current flow in subscriber line 51, the voltage on conductor 123 will fall below VRF3, conductor 276 will be pulled to a logical 1, and the output of inverter 282 will be a logical 0, thereby advising control unit 11 that the party on the other end has hung up.

Figure 7A:
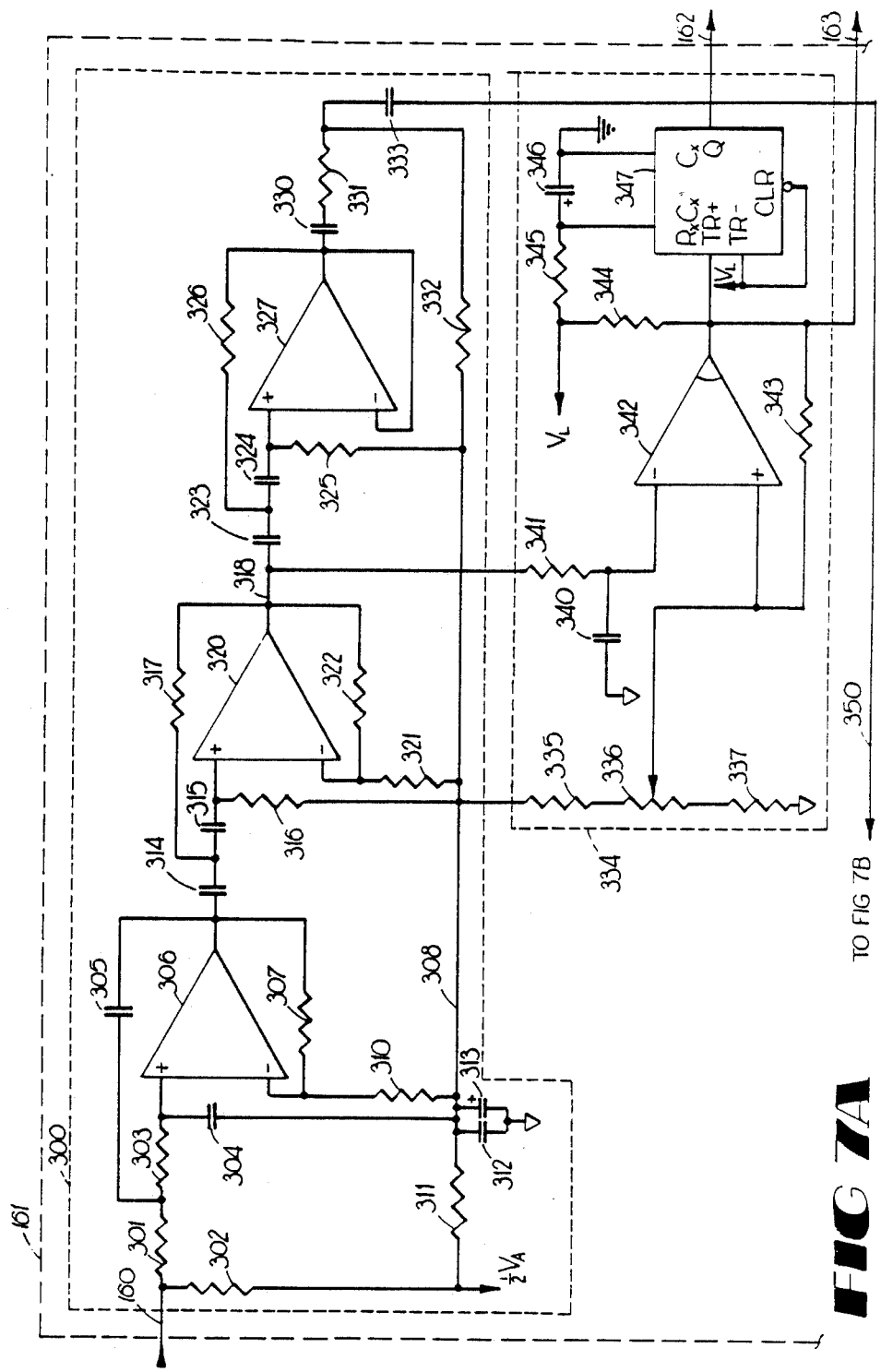
FIG. 7 is a schematic diagram of a tone detector.

Turn now to FIG. 7 which is a schematic diagram of tone detector 161. Tone detector 161 comprises a bandpass filter 300, a high frequency detector 334, and phase-locked loops 351 and 381. One output of switching matrix 21 is connected to the input of tone detector 161 by conductor 160 of signal bus 35. Control unit 11 commands switching matrix 21 to route the output of cassette interface 17, the signal present on subscriber line 51, and the signal present on extension line 47, as appropriate, to tone detector 161. Tone detector 161 has four digital output signals: a "voice present" signal on conductor 162, a "high frequency present" signal on conductor 163, and two "tone present" signals on conductor 164 and 165. These four digital outputs are connected to the inputs of tri-state latch 109-2 of FIG. 2 by conductors 162, 163, 164 and 165. Control unit 11 reads the outputs of tone detector 161 by commanding tri-state latch 109-2 to place its contents on data bus 25.

The tone present signal on conductor 165 may indicate the presence of an 1882 Hz tone or a 1776 Hz tone. Control unit 11 commands phase-locked loop 351 to be responsive to 1882 Hz tones by placing a logical 1 onto data bus 25 and then commanding input latch 108 to store the signals present on data bus 25. Input latch 108 will then place a logical 1 onto conductor 158, thereby causing phase-locked loop 351 to respond to 1882 Hz tones. A logical 0 on conductor 158 causes phase-locked loop 351 to respond to 1776 Hz tones. Control unit 11 also commands phase-locked loop 381 to be responsive to 3266 Hz tone or to another tone. The frequency of this other tone has not been designated and is reserved for a future need, if any, for another distinctive tone. Control unit 11 controls phase-locked loop 381 in the same manner as it controls phase-locked loop 351. The control input of phase-locked loop 381 is connected to input latch 108 by conductor 159. A logical 0 on conductor 159 causes phase-locked loop 381 to be responsive to 3266 Hz tones. The output of phase-locked loop 381 is connected to one input of output latch 109-2 by conductor 164. The mechanism by which signals on conductor 158 and 159 control phase-locked loops 351 and 381 are discussed hereinbelow.

It will be appreciated that bandpass filter 300 is an active three-stage, multiple-pole Chebyshev-type filter which also has a second-stage output pickoff point. The details of operation of active filters of the Chebyshev type are well known to those skilled in the art. The first stage is a second-order lowpass filter with a gain of 4 and a −3 dB frequency of 2.8 kHz. The second and third stages are second order highpass filters with a gain of 4.5 and a −3 dB frequency of 1 kHz, and a gain of 1 and a −3 dB frequency of 2 kHz, respectively.

Since bandpass filter 300 is an active filter constructed in a known manner using RC networks and operational amplifiers the details of operation will not be discussed. However, Table I below sets forth the values of critical resistors and capacitors. Capacitor values are given in microfarads and resistor values in kilohms.

TABLE I

| Reference Number | Component Value |
|---|---|
| 301 | 3.29 |
| 303 | 5.6 |
| 304 | .022 |
| 305 | .01 |
| 307 | 35.5 |
| 310 | 11.85 |
| 314 | .01 |
| 315 | .01 |
| 316 | 9.36 |
| 317 | 23.77 |
| 321 | 10.7 |
| 322 | 37.46 |
| 323 | .01 |
| 324 | .01 |
| 325 | 11.45 |
| 326 | 4.86 |
| 330 | .1 |
| 331 | 10. |
| 332 | 1. |

The first two stages of bandpass filter 300 compose an active bandpass filter which places its output on conductor 318 and which has a gain of 18, and −3 dB frequencies of 1 kHz and 2.8 kHz. Normal human voices, both male and female, have a speech frequency spectrum which exhibits a strong peak in the 750 Hz region. These first two stages therefore significantly attenuate the primary human speech frequencies. High frequency detector 334, in combination with the first two stages of bandpass filter 300, therefore detects the presence of frequencies above the normal primary human speech frequencies. Therefore, with the exception of the particular band of frequencies to be detected, the operation is the same as that of speech detector 115, which is described in detail in U.S. Pat. No. 4,477,698.

Critical resistor and capacitor values for high frequency detector 334 are set forth in Table II below. Resistor values are in kilohm and capacitor values are in microfarads.

TABLE II

| Reference Numeral | Component Value |
|---|---|
| 335 | 4.7 |
| 336 | 10 |
| 337 | 150 |
| 340 | .01 |
| 341 | 5.6 |
| 343 | 1000 |
| 345 | 34.0 |
| 346 | 1.5 |

The three stages of bandpass filter 300 compose an active bandpass filter with a gain of 18, a second-order high-frequency −3 dB rolloff point of 2.8 kHz, a second-order low-frequency −3 dB rolloff point of 1 kHz, and a second, second-order low-frequency −3 dB rolloff point of 2 kHz.

It should be noted that the inputs of the three stages are connected to conductor 308. Conductor 308 is connected to a voltage (½ VA) of one-half of the analog power supply voltage by resistor 311. It will be appreciated that this voltage is required to bias operational amplifiers 306, 320 and 327 of the three gain stages in the middle of their linear operating region. Capacitors 312 and 313 are connected between conductor 308 and the system ground. Resistor 311 and capacitors 312 and 313 comprise a low pass filter which prevents noise on the system analog power supply from affecting the voltage on conductor 308.

The output of the third stage of bandpass filter 300 is connected to conductor 308 by the series combination of capacitor 330 and resistors 331 and 332. Capacitor 330 is a DC blocking capacitor which prevents the output of the third stage from disturbing the voltage on conductor 308. Resistors 331 and 332 comprise a voltage divider to reduce the signal voltage being sent to phase-locked loops 351 and 381. The output of bandpass filter 300 is on conductor 350, which is connected to the junction of resistors 331 and 332 by DC blocking capacitor 333.

From the above, it will be appreciated that the output of bandpass filter 300 on conductor 350 consists of that part of the signals on conductor 160 which has frequency components between 2.0 and 2.8 kHz. Conductor 350 is connected to the inputs of phase-locked loops 351 and 381. Conductor 350 is connected to the input terminal of devices 362 and 392 through current-limiting and parasitic suppression resistors 352 and 382, respectively. Devices 362 and 392 are commercially available phase-locked loops, such as the XR-2211, which is manufactured by Exar Company of Sunnyvale, Calif. It will be appreciated that other phase-locked loop devices may also be used. The frequency- and bandwidth-determining components of phase-locked loop 351 (381) are capacitors 353 (383) and 364 (394), resistors 355 (385), 356 (386), 357 (387), 360 (390), and 361 (391), and the conduction state of transistor 354 (384). Resistor and capacitor values are set forth in Table III below. Resistor values are in kilohms and capacitor values are in microfarads.

TABLE III

| Reference Numeral | Component Value |
|---|---|
| 353 | .022 |
| 355 | 10 |
| 356 | 27.4 |
| 357 | 10 |
| 360 | 17.8 |
| 361 | 100 |
| 364 | .0047 |
| 383 | .01 |
| 385 | 10 |
| 386 | 1 |
| 387 | 10 |
| 390 | 24.9 |
| 391 | 150 |
| 394 | .0022 |

Capacitor 353 (383) is connected between the C13 and C14 terminals of device 362 (392). The Loop Phase-Detector output of device 362 (392) is connected to system ground through capacitor 364 (394) and to the R-input of device 362 (392) through resistor 361 (391). The R-input of device 362 (392) is connected to node 358 (388) through resistor 360 (390). Node 358 (388) is connected to system ground through resistor 357 (387) and also through the series combination of resistors 355 and 356 (385 and 386) and field effect transistor 354 (384). If conductor 158 (159) has a logical 0 placed on it, transistor 354 (384) will be turned off and appear as an open circuit. The frequency of phase-locked loop 351 (381) will therefore be determined by capacitor 353 (383) and the series resistance of resistors 357 and 360 (387 and 390). Resistor 357 (387) is a trimmer potentiometer and is adjusted to set the frequency of loop 351 (381) to 1776 Hz (3266 Hz).

If the voltage on conductor 158 (159) is a logical 1 transistor 354 (384) will be turned on and appear as a short circuit. The frequency of phase-locked loop 351

(381) will then be determined by capacitor 353 (383) and the effective resistance of resistor 360 (390) in series with resistor 357 (387) which is in parallel with the series combination of resistors 355 and 356 (385 and 386). The effective resistance will therefore be lower and the detected frequency, which is inversely proportional to the effective resistance, will be higher. Resistor 355 is a potentiometer which is adjusted to set the second tone frequency of loop 351 to 1882 Hz. Resistor 385 performs a similar function with respect to loop 381 but, in this particular application, the second tone frequency is unspecified since it is not currently needed for any purpose.

The frequencies 1882 Hz and 3266 Hz were selected to detect signals indicating the beginning and end, respectively, of a message recorded on cassette recorder 40 and cassette player 41.

The 1776 Hz frequency tone was selected since this is the standard third tone of the three-tone interrupt sequence that central office 50 places on subscriber line 51 to advise the user that the call cannot be completed as dialed.

The negated Q output of device 362 (392) is an open-collector output which is a logical 0 when there is no frequency lock, i.e., the desired tone is not present, and is an open circuit when there is a frequency lock, i.e., the desired tone is present. The negated Q output of device 362 (392) on conductor 369 (399) is connected to the logic supply voltage VL by pullup resistor 370 (400) and by the series combination of capacitor 371 (401) and resistor 372 (402), and is also connected to the input of schmitt-trigger inverter 373 (403). The output of inverter 373 (403) is connected to conductor 165 (164). Inverter 373 (403) is of the schmitt type to prevent minor power supply voltage variations and noise from causing an erroneous signal to be placed on conductor 165 (164).

It will now be remembered that bandpass filter 300 passes 2.0 to 2.8 kHz signals to phase-locked loops 351 and 381. Although the primary frequency of normal human speech is in the region of 750 Hz it will be recognized that some components of human speech are briefly present in the 2.0 to 2.8 kHz band. Devices 362 and 392 may be briefly and intermittently lock onto these speech components, thus giving an erroneous tone-detect signal. Resistor 372 (402) and capacitor 371 (401) form a filter which requires the output of device 362 (392) to maintain an open circuit or a logical 0 output for a short period of time before the voltage on conductor 369 (399) will change a sufficient amount to cause inverter 373 (403) to change its output state thereby substantially reducing the probability of an erroneous tone-detect signal.

From the foregoing description of the preferred embodiment, it will be apparent that other embodiments of the present invention may be constructed on the principles disclosed herein. Therefore, the scope of the present invention is to be limited only by the claims below.

I claim:

1. For use with a telephone system including a telephone company central office for providing a loop current and a subscriber line which conducts said loop current, a transformerless loop current modulator responsive to an audio input signal for placing audio signals onto said subscriber line by modulating said loop current, comprising:

variable resistance means connected across said subscriber line for modulating said loop current by conducting a variable current corresponding to a bias voltage;

biasing means for providing said bias voltage, said bias voltage biasing said variable resistance means in a linear operating region;

modulating means responsive to said audio input signal for modulating said bias voltage; and switching means connected to said biasing means and responsive to a digital command signal for allowing said variable current to be conducted by enabling said variable resistance means.

2. The transformerless loop current modulator of claim 1 wherein said subscriber line comprises a first conductor and a second conductor and said variable resistance means comprises:

a transistor having a control terminal, a reference terminal, and an output terminal, said control terminal being connected to said biasing means, and said output terminal being connected to said first conductor; and a resistor connected between said reference terminal and said second conductor.

3. The transformerless loop current modulator of claim 2 wherein said transistor is an NPN transistor.

4. The transformerless loop current modulator of claim 1 and further comprising:

rectifying means connected between said subscriber line and said variable resistance means for providing a first polarity signal to a first conductor and a second polarity signal to a second conductor;

and wherein said variable resistance means comprises:

a transistor having a control terminal, a reference terminal, and an output terminal, said control terminal being connected to said biasing means, and said output terminal being connected to said first conductor; and a resistor connected between said reference terminal and said second conductor.

5. The transformerless loop current modulator of claim 4 wherein said transistor is an NPN transistor.

6. The transformerless loop current modulator of claim 4 wherein said rectifying means comprises a full-wave bridge rectifier.

7. The transformerless loop current modulator of claim 1 wherein, when said variable resistance means is enabled, said bias voltage causes said variable resistance means to conduct at least a predetermined loop current, said predetermined loop current being sufficient to cause said central office to detect an off hook condition.

8. For use with a telephone system including a telephone company central office for providing a loop current and a subscriber line which conducts said loop current, a transformerless loop current modulator responsive to an audio input signal for placing audio signals onto said subscriber line by modulating said loop current, comprising:

a controllable current source connected across said subscriber line for modulating said loop current by sourcing a controlled current corresponding to a bias signal;

biasing means for providing said bias signal, said bias signal biasing said controllable current source in a linear operating region;

modulating means responsive to said audio input signal for modulating said bias signal; and switching means responsive to a digital command signal for allowing said controlled current to be sourced by enabling said controlled current source.

9. The transformerless loop current modulator of claim 8 wherein said subscriber line comprises a first conductor and a second conductor and said controllable current source comprises:
   a transistor having a control terminal, a reference terminal, and an output terminal, said control terminal being connected to said biasing means, and said output terminal being connected to said first conductor; and
   a resistor connected between said reference terminal and said second conductor.

10. The transformerless loop current modulator of claim 9 wherein said transistor is an NPN transistor.

11. The transformerless loop current modulator of claim 8 and further comprising:
   rectifying means connected between said subscriber line and said variable resistance means for providing a first polarity signal to a first conductor and a second polarity signal to a second conductor; and wherein said controllable current source comprises:
   a transistor having a control terminal, a reference terminal, and an output terminal, said control terminal being connected to said biasing means, and said output terminal being connected to said first conductor; and
   a resistor connected between said reference terminal and said second conductor.

12. The transformerless loop current modulator of claim 11 wherein said transistor is an NPN transistor.

13. The transformerless loop current modulator of claim 11 wherein said rectifying means comprises a full-wave bridge rectifier.

14. The transformerless loop current modulator of claim 8 wherein, when said controllable current source is enabled, said bias signal causes said controllable current source to source at least a predetermined loop current, said predetermined loop current being sufficient to cause said central office to detect an off hook condition.

* * * * *